United States Patent
Tu et al.

(10) Patent No.: US 9,420,285 B2
(45) Date of Patent: Aug. 16, 2016

(54) INTER-LAYER MODE DERIVATION FOR PREDICTION IN SCALABLE VIDEO CODING

(71) Applicant: QUALCOMM Incorporated, San Diego, CA (US)

(72) Inventors: Chengjie Tu, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 13/860,442

(22) Filed: Apr. 10, 2013

(65) Prior Publication Data

US 2013/0272402 A1    Oct. 17, 2013

Related U.S. Application Data

(60) Provisional application No. 61/623,505, filed on Apr. 12, 2012, provisional application No. 61/706,628, filed on Sep. 27, 2012.

(51) Int. Cl.

| | |
|---|---|
| *H04N 19/159* | (2014.01) |
| *H04N 19/103* | (2014.01) |
| *H04N 19/187* | (2014.01) |
| *H04N 19/50* | (2014.01) |
| *H04N 19/52* | (2014.01) |
| *H04N 19/176* | (2014.01) |

(Continued)

(52) U.S. Cl.
CPC ....... *H04N 19/00569* (2013.01); *H04N 19/103* (2014.11); *H04N 19/159* (2014.11); *H04N 19/176* (2014.11); *H04N 19/187* (2014.11); *H04N 19/196* (2014.11); *H04N 19/30* (2014.11); *H04N 19/52* (2014.11)

(58) Field of Classification Search
CPC .......... H04N 19/00569; H04N 19/103; H04N 19/159; H04N 19/176; H04N 19/187; H04N 19/196; H04N 19/30; H04N 19/52
See application file for complete search history.

(56) References Cited

U.S. PATENT DOCUMENTS

| | | | |
|---|---|---|---|
| 7,627,034 B2 | 12/2009 | Park et al. | |
| 7,847,861 B2 | 12/2010 | Zhai et al. | |
| 7,903,735 B2 | 3/2011 | Cha et al. | |

(Continued)

FOREIGN PATENT DOCUMENTS

EP    1914996 A2    4/2008

OTHER PUBLICATIONS

Li, He, et al. "Fast Mode Decision for Spatial Scalable Video Coding", IEEE (2006).*

(Continued)

*Primary Examiner* — William C Vaughn, Jr.
*Assistant Examiner* — Lindsay Uhl
(74) *Attorney, Agent, or Firm* — Knobbe, Martens, Olson & Bear, LLP

(57) ABSTRACT

In some embodiments of a video coder, if some prediction information is not available for a first block in a current layer, the video coder uses corresponding information (e.g., intra prediction direction and motion information), if available, from the first block's co-located second block in the base layer as if it were the prediction information for the first block. The corresponding information can then be used in the current layer to determine the prediction information of succeeding blocks in the current layer.

39 Claims, 9 Drawing Sheets

(51) Int. Cl.
*H04N 19/30* (2014.01)
*H04N 19/196* (2014.01)

(56) References Cited

U.S. PATENT DOCUMENTS

| | | | |
|---|---|---|---|
| 7,978,770 | B2 | 7/2011 | Luo et al. |
| 8,111,745 | B2 | 2/2012 | Han et al. |
| 2006/0008003 | A1 | 1/2006 | Ji et al. |
| 2006/0104354 | A1 | 5/2006 | Han et al. |
| 2006/0120450 | A1 | 6/2006 | Han et al. |
| 2006/0153295 | A1 | 7/2006 | Wang et al. |
| 2006/0153300 | A1 | 7/2006 | Wang et al. |
| 2006/0176957 | A1 | 8/2006 | Han et al. |
| 2008/0089411 | A1* | 4/2008 | Wenger .............. H04N 19/105 375/240.12 |
| 2008/0267291 | A1 | 10/2008 | Vieron et al. |
| 2009/0220004 | A1* | 9/2009 | Cieplinski et al. ......... 375/240.16 |
| 2009/0323809 | A1* | 12/2009 | Raveendran ............ 375/240.16 |
| 2011/0075734 | A1* | 3/2011 | Sakazume ............... 375/240.12 |
| 2013/0272411 | A1 | 10/2013 | Tu et al. |
| 2014/0003495 | A1* | 1/2014 | Chuang ............. H04N 19/0003 375/240.02 |

OTHER PUBLICATIONS

Bross, et al., "WD4: Working Draft 4 of High Efficiency Video Coding", Output Document of JCT-VC, Doc. No. JCTVC-F803d (Torino, Jul. 2011).*

Wiegand, Thomas, et al., Meeting Report, Draft 7, Joint Video Team (JVT) of ISO/IEC MPEG & ITU-T VCEG, Doc. No. JVT-W200 (draft) (May 2007).*

Anonymous: "Test Model under Consideration for High-Efficiency Video Coding", 92. MPEG Meeting; Apr. 19-Apr. 23, 2010; Dresden; (Motion Picture Expert Group or ISO/IEC JTC1/SC29/WG11), No. N11280, Jul. 28, 2010, XP030017777, ISSN: 0000-0029, pp. 152.

Chen J., et al., "Description of Scalable Video coding Technology Proposal by Qualcomm (Configuration 2)", 11. JCT-VC Meeting; 102. MPEG Meeting Oct. 10-Oct. 19, 2012; Shanghai; (Joint Collaborative Team on Video Coding of ISO/IEC JTC1/SC29/WG11 and ITU-T SG.16); < URL: http://wftp3.itu.int/av-arch/jctvc-site/no. jvtcv-k0036 >, Oct. 2, 2012, XP030112968, pp. 1-22.

International Search Report and Written Opinion—PCT/US2013/036121—ISA/EPO—Jul. 30, 2013.

Reichel J., et al., "Joint Scalable Video Model" (JSVM) 4, 74. MPEG Meeting, (Oct. 17-Oct. 21, 2005), Nice, Motion Picture Expertgroup or ISO/IEC JTC1/SC29/WG11, No. N7556, Nov. 18, 2005, XP030014101, ISSN: 0000-0344, Section 1.2.3.2. Inter Layer Motion Prediction; pp. 1-41.

Lange R., "Extended inter-layer motion vectors prediction in scalable video coding—case study and improvement proposal", 18. JVT Meeting; 75. MPEG Meeting; Jan. 14-Jan. 20, 2006; Bangkok, TH; (Joint Video Team of ISO/IEC JTC1/SC29/WG11 and ITU-T SG.16), No. JVT-R094, Jan. 17, 2006, XP030006361, ISSN: 0000-0410; pp. 1-20.

Laroche G., et al., "RD Optimized Coding for Motion Vector Predictor Selection",IEEE Transaction on Circuits and Systems for Video Technology, IEEE Service Center, Piscataway, NJ, US, vol. 18 (9), Sep. 1, 2008, pp. 1247- 1257, XP011231739, ISSN: 1051-8215, DOI: 10.1109/TCSVT.2008.92882.

Lin J.L., et al., "Improved Advanced Motion Vector Prediction," 4. JCT-VC Meeting; 95. MPEG Meeting; Jan. 20-Jan. 28, 2011; MEGU; (Joint Collaborative Team on Video Coding of ISO/IEC JTC1/SC29/WG11AND ITU-T Sg. 16); <URL: http://wftp3.itu.int/av-arch/jc tvc-site/>, No. JCTVC-D125, Jan. 15, 2011, XP030008165, ISSN: 0000-0015; pp. 1-8.

Martin Aurelie et al., "Atomic decomposition dedicated to AVC and spatial SVC prediction", IEEE International Conference on Image Processing, Oct. 12, 2008, pp. 2492-2495, XP031374546, ISBN: 978-4244-1765-0.

Park Chun-Su et al., "Estimation-Based Interlayer Intra Prediction for Scalable Video Coding", IEEE Transactions on Circuits And Systems For Video Technology, vol. 19, No. 12, Jul. 7, 2009, pp. 1902-1907, XP011281910, ISSN: 1051-8215, DOI: 10.1109/TCSVT.2009.2026945.

Puri, et al., "Video Coding Using the H.264/Mpeg-4 Avc Compression Standard," Signal Processing Image Communication, Elsevier Science Publishers, Oct. 1, 2004, pp. 793-849, vol. 19 (9),Amsterdam, NL, XP004607150, ISSN: 0923-5965.

Schwarz H et al: "Overview of the Scalable Video Coding Extension of the H.264/AVC Standard", IEEE Transactions on Circuits and Systems for Video Technology, Sep. 24, 2007, vol. 17, No. 9, pp. 1103-1120, XP011193019, ISSN: 1051-8215, DOI: 10.1109/TCSVT.2007.905532.

Yang H., et al., "Description of Scalable Video coding Technology Proposal by Huawei Technologies", 11. JCT-VC Meeting; 102. MPEG Meeting Oct. 10-Oct. 19, 2012; Shanghai; (Joint Collaborative Team on Video Coding of ISO/IEC JTC1/SC29/WG11 and ITU-T SG.16); <URL: http://wftp3.itu.int/av-arch/jctvc-site/no. jvtcv-k0046>, Oct. 2, 2012, XP030112978, Section 2.2.3.1 Retrieving motion information from base-layer; pp. 1-15.

* cited by examiner

INTER-LAYER MODE DERIVATION FOR PREDICTION IN SCALABLE VIDEO CODING

CROSS REFERENCE TO RELATED APPLICATION

This application claims priority from U.S. Provisional No. 61/706,628, filed Sep. 27, 2012, and from U.S. Provisional No. 61/623,505, filed Apr. 12, 2012, both of which are incorporated by reference in their entirety.

TECHNICAL FIELD

This disclosure relates to video coding and compression and, in particular, to scalable video coding (SVC).

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Some block-based video coding and compression makes use of scalable techniques. Scalable video coding (SVC) refers to video coding in which a base layer and one or more scalable enhancement layers are used. For SVC, a base layer typically carries video data with a base level of quality. One or more enhancement layers carry additional video data to support, e.g., higher spatial, temporal and/or SNR levels. In some cases, the base layer may be transmitted in a manner that is more reliable than the transmission of enhancement layers. In the discussion below, a "base layer" could mean the absolute base layer, possibly generated by a non-scalable codec such as H.264, or it could mean a previously-encoded enhancement layer that is used as the basis in encoding the current enhancement layer. Base layers may also be referred to as lower layers, and enhancement layers may also be referred to as higher layers.

DETAILED DESCRIPTION

Figure 1:
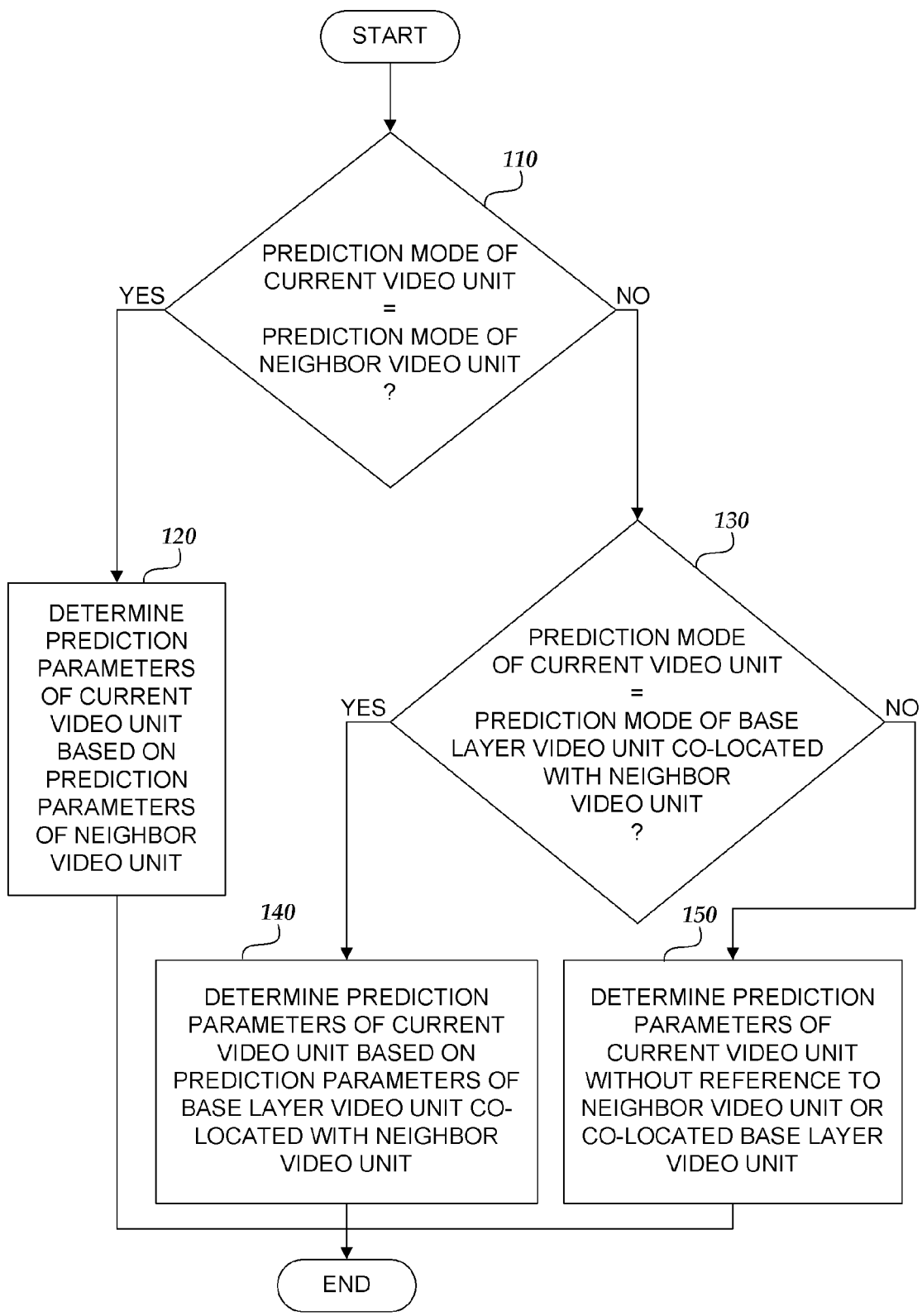
FIG. 1 is a flow diagram illustrating an example process for determining prediction parameters in accordance with techniques of this disclosure.

Video coders may support multiple prediction modes for reducing redundancy in different aspects of encoded video, as described above. For example, an inter mode may reduce redundancy between blocks in different frames, an intra mode may reduce redundancy between blocks in the same frame, and an intra BL mode may reduce redundancy between blocks in different layers. Some or all prediction modes may have parameters associated with them. Prediction parameters may include, for example, motion vectors for inter-coded blocks or prediction directions for intra-coded blocks.

An encoder may select a prediction mode and a set of parameters to provide the best prediction available for each block, based on the content of the block. In many cases, blocks that are close to one another may have similar prediction parameters. Therefore, prediction parameters may themselves be predicted, based on parameters from neighboring blocks. However, if a neighboring block uses a different prediction mode than the current block, the neighboring block's parameters may not be useful for predicting the current block's parameters. Accordingly, it may be beneficial to identify an alternate source of parameters that are likely to be similar to the parameters of the current block.

In scalable video coding, prediction parameters of a base layer block may be similar to prediction parameters of a corresponding enhancement layer block. The term "corresponds" or "corresponding" is a broad term and is to be given its ordinary and customary meaning to a person of ordinary skill in the art (i.e., it is not to be limited to a special or customized meaning), and may include, without limitation, co-located blocks in various layers. The likely similarity of prediction parameters between corresponding blocks in a base layer and enhancement layer may be exploited in combination with the likely similarity of prediction parameters for neighboring blocks in the same layer, described above. Specifically, when parameters for a current block in an enhancement layer cannot be predicted from parameters of a neighbor block because the neighbor block uses a different prediction mode, it may be possible to obtain a set of parameters from a base layer block that corresponds to the neighbor block. The obtained parameters may then be used as a basis for predicting the parameters for the current block. In particular, this approach may be useful when the prediction mode of the current block from the enhancement layer matches the prediction mode of the base layer block.

Features of the present disclosure may help improve coding efficiency by allowing more prediction parameters to be represented as residuals. Such residuals may comprise a difference between the prediction parameters being represented and a set of reference parameters. The difference may be small in most cases because the reference parameters are chosen for their likely similarity to the represented prediction parameters. Accordingly, the residuals may be expected to occupy fewer bits than the prediction parameters themselves. As a result, better video quality may be provided at the same bit rate, or video of the same quality may be provided at a lower bit rate.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1 is a flow diagram that illustrates an example process for determining prediction parameters in accordance with techniques of this disclosure. The process may be used with video coders of the sort depicted in FIGS. 2, 8, and 9. Specifically, the process may be used to determine prediction parameters for a current video unit in an enhancement layer, as described above, based on prediction parameters associated with a base layer video unit that is co-located with a neighbor of the current video unit. The process may proceed as follows. At block 110, the video coder may determine if the prediction mode of the current video unit is the same as the prediction mode of the neighboring video unit. If the prediction modes match, the process continues to block 120, where the video coder determines the prediction parameters of the current video unit based on the prediction parameters of the neighboring video unit. If the prediction modes do not match, the process continues to block 130, where the video coder determines if the prediction mode of the current video unit is the same as the prediction mode of a video unit in a base layer that is co-located with the current video unit's neighbor in the enhancement layer. The video coder may check the prediction modes of co-located blocks in several base layers below the enhancement layer, until a co-located block with a matching prediction mode is found. If a prediction mode match is found at block 130, the process continues to block 140 where the prediction parameters for the current video unit are determined from the prediction parameters of the matched video unit in the relevant base layer. If a prediction mode match is not found at block 130, the process continues to block 150, where the prediction parameters for the current video unit are determined without reference to neighboring video units in the enhancement layer, and without reference to video units in a base layer that are co-located with the neighboring video units.

Figure 2:
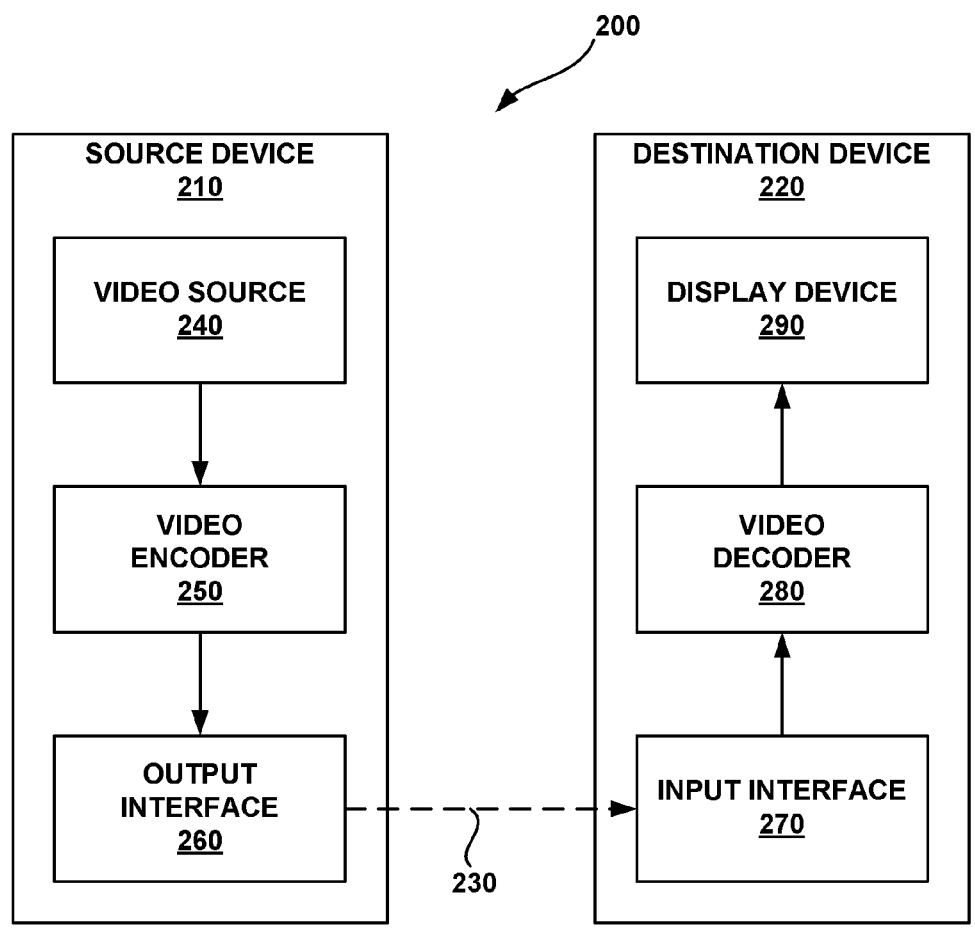
FIG. 2 is a block diagram illustrating an example video coding system that may utilize the techniques of this disclosure.

FIG. 2 is a block diagram that illustrates an example video coding system 10 that may utilize the techniques of this disclosure. As used described herein, the term "video coder" refers generically to both video encoders and video decoders. In this disclosure, the terms "video coding" or "coding" may refer generically to video encoding and video decoding.

As shown in FIG. 2, video coding system 200 includes a source device 210 and a destination device 220. Source device 210 generates encoded video data. Destination device 220 may decode the encoded video data generated by source device 210. Source device 210 and destination device 220 may comprise a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, or the like. In some examples, source device 210 and destination device 220 may be equipped for wireless communication.

Destination device 220 may receive encoded video data from source device 210 via a channel 230. Channel 230 may comprise any type of medium or device capable of moving the encoded video data from source device 210 to destination device 220. In one example, channel 230 may comprise a communication medium that enables source device 210 to transmit encoded video data directly to destination device 220 in real-time. In this example, source device 210 may modulate the encoded video data according to a communication standard, such as a wireless communication protocol, and may transmit the modulated video data to destination device 220. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 210 to destination device 220.

In another example, channel 230 may correspond to a storage medium that stores the encoded video data generated by source device 210. In this example, destination device 220 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 230 may include a file server or another intermediate storage device that stores the encoded video generated by source device 210. In this example, destination device 220 may access encoded video data stored at the file server or other intermediate storage device via streaming or download. The file server may be a type of server capable of storing encoded video data and transmitting the encoded video data to destination device 220. Example file servers include web servers (e.g., for a website), FTP servers, network attached storage (NAS) devices, and local disk drives. Destination device 220 may access the encoded video data through any standard data connection, including an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 2, source device 210 includes a video source 240, video encoder 250, and an output interface 260. In some cases, output interface 260 may include a modulator/demodulator (modem) and/or a transmitter. In source device 210, video source 240 may include a source such as a video capture device, e.g., a video camera, a video archive containing previously captured video data, a video feed interface to receive video data from a video content provider, and/or a computer graphics system for generating video data, or a combination of such sources.

Video encoder 250 may encode the captured, pre-captured, or computer-generated video data. The encoded video data may be transmitted directly to destination device 220 via output interface 260 of source device 210. The encoded video data may also be stored onto a storage medium or a file server for later access by destination device 220 for decoding and/or playback.

In the example of FIG. 2, destination device 220 includes an input interface 270, a video decoder 280, and a display device 290. In some cases, input interface 270 may include a receiver and/or a modem. Input interface 270 of destination device 220 receives encoded video data over channel 230. The encoded video data may include a variety of syntax elements generated by video encoder 250 that represent the video data. Such syntax elements may be included with the encoded video data transmitted on a communication medium, stored on a storage medium, or stored a file server.

Display device 290 may be integrated with or may be external to destination device 220. In some examples, destination device 220 may include an integrated display device and may also be configured to interface with an external display device. In other examples, destination device 220 may be a display device. In general, display device 290 displays the decoded video data to a user. Display device 290 may comprise any of a variety of display devices such as a liquid crystal display (LCD), a plasma display, an organic light emitting diode (OLED) display, or another type of display device.

Video encoder 250 and video decoder 280 may operate according to a video compression standard, such as the High Efficiency Video Coding (HEVC) standard presently under development, and may conform to a HEVC Test Model (HM). Alternatively, video encoder 250 and video decoder 280 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the example of FIG. 2, video encoder 250 and video decoder 280 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 2 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 250 and video decoder 280 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 250 and video decoder 280 may be included in one or more encoders or decoders, either of which may be integrated as part of a combined encoder/decoder (CODEC) in a respective device.

As mentioned briefly above, video encoder 250 encodes video data. The video data may comprise one or more pictures. Each of the pictures is a still image forming part of a video. In some instances, a picture may be referred to as a video "frame." When video encoder 250 encodes the video data, video encoder 250 may generate a bitstream. The bitstream may include a sequence of bits that form a coded representation of the video data. The bitstream may include coded pictures and associated data. A coded picture is a coded representation of a picture.

To generate the bitstream, video encoder 250 may perform encoding operations on each picture in the video data. When video encoder 250 performs encoding operations on the pictures, video encoder 250 may generate a series of coded pictures and associated data. The associated data may include sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures.

To generate a coded picture, video encoder 250 may partition a picture into equally-sized video blocks. Each of the video blocks is associated with a treeblock. In some instances, a treeblock may also be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 250 may use quadtree partitioning to partition the video blocks of treeblocks into video blocks associated with CUs, hence the name "treeblocks."

A CU may refer to a rectangular image region that serves as a basic unit to which various coding tools are applied for video compression. To achieve better coding efficiency, a coding unit may have variable sizes depending on video content. To reduce redundancy, a CU is predicted and prediction residuals are signaled. A CU may split into smaller blocks for prediction (prediction units or PUs). According to HEVC or HM (the reference software for HEVC), a CU can have one of the two prediction modes: INTRA mode and INTER mode. A CU may also be split into smaller blocks for transform and each of these blocks is called a transform unit (TU).

In some examples, video encoder 250 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 250 may perform encoding operations on each slice of the picture. When video encoder 250 performs an encoding operation on a slice, video encoder 250 may generate encoded data associated with the slice. The encoded data associated with the slice may be referred to as a "coded slice."

To generate a coded slice, video encoder 250 may perform encoding operations on each treeblock in a slice. When video encoder 250 performs an encoding operation on a treeblock, video encoder 250 may generate a coded treeblock. The coded treeblock may comprise data representing an encoded version of the treeblock.

To generate a coded treeblock, video encoder 250 may recursively perform quadtree partitioning on the video block of the treeblock to divide the video block into progressively smaller video blocks. Each of the smaller video blocks may be associated with a different CU. For example, video encoder 250 may partition the video block of a treeblock into four equally-sized sub-blocks, partition one or more of the sub-blocks into four equally-sized sub-sub-blocks, and so on. One or more syntax elements in the bitstream may indicate a maximum number of times video encoder 250 may partition the video block of a treeblock. A video block of a CU may be square in shape. The size of the video block of a CU (i.e., the size of the CU) may range from 8×8 pixels up to the size of a video block of a treeblock (i.e., the size of the treeblock) with a maximum of 64×64 pixels or greater.

When video encoder 250 encodes a non-partitioned CU, video encoder 250 may generate one or more prediction units (PUs) for the CU. A non-partitioned CU is a CU whose video block is not partitioned into video blocks for other CUs. Each of the PUs of the CU may be associated with a different video block within the video block of the CU. Video encoder 250 may generate a predicted video block for each PU of the CU. The predicted video block of a PU may be a block of samples. Video encoder 250 may use intra prediction or inter prediction to generate the predicted video block for a PU.

When video encoder 250 uses intra prediction to generate the predicted video block of a PU, video encoder 250 may generate the predicted video block of the PU based on decoded samples of the picture associated with the PU. When video encoder 250 uses inter prediction to generate the predicted video block of the PU, video encoder 250 may generate the predicted video block of the PU based on decoded values of pictures other than the picture associated with the PU. If video encoder 250 uses intra prediction to generate predicted video blocks of the PUs of a CU, the CU is an intra-predicted CU.

Figure 3:
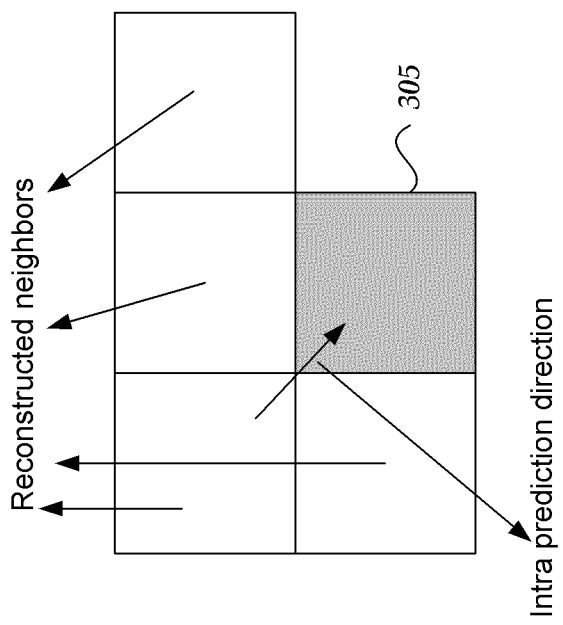
FIG. 3 is a conceptual diagram that illustrates an embodiment of intra mode.

FIG. 3 is a conceptual diagram that illustrates an embodiment of intra mode. A PU 305 in an INTRA CU may be predicted spatially from already reconstructed neighboring pixels from the same frame or slice. Multiple intra prediction directions are allowed and the best direction is signaled in the bitstream. Different PUs in an INTRA CU may have different prediction directions.

When video encoder 250 uses intra prediction on a PU, video encoder 250 may generate a list of candidate intra prediction modes. The list of candidate intra prediction modes may be based on the intra prediction modes of PUs that spatially or temporally neighbor the PU. In addition, as described below, the list of candidate intra prediction modes may include an intra prediction mode from a base layer. Video encoder 250 may select one of the candidates from the list and generate an index that indicates a location of the selected candidate in the list. Video encoder 250 may signal the intra prediction mode of the PU by outputting the index. In some instances, video encoder 250 may signal the intra prediction mode of the PU by outputting the index of the selected candidate and outputting a difference between the intra prediction mode of the selected candidate and the intra prediction mode of the PU.

When video encoder 250 uses inter prediction to generate a predicted video block for a PU, video encoder 250 may generate motion information for the PU. The motion information for a PU may indicate a portion of another picture that corresponds to the video block of the PU. In other words, the motion information for a PU may indicate a "reference sample" for the PU. Video encoder 250 may generate the predicted video block for the PU based on the portions of the other pictures that are indicated by the motion information for the PU. If video encoder 250 uses inter prediction to generate predicted video blocks for the PUs of a CU, the CU is an inter-predicted CU.

Figure 4:
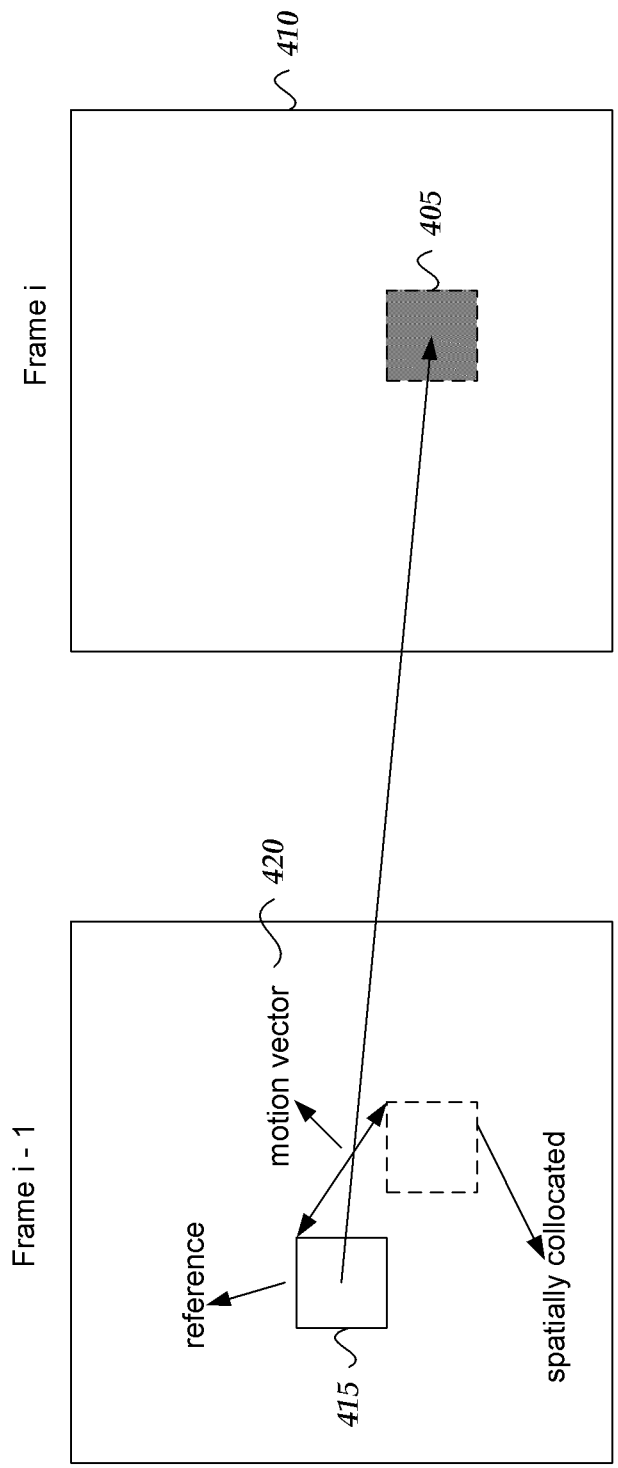
FIG. 4 is a conceptual diagram that illustrates an embodiment of inter mode.

FIG. 4 is a conceptual diagram that illustrates an embodiment of inter mode. A PU 405 in an INTER CU 410 may be predicted temporally from best matched block or weighted blocks in already decoded previous frame or frames (in decoded order). Such blocks may be called reference blocks 415. The motion information 420 which identifies the reference block or blocks may be signaled in the bitstream. This is illustrated in FIG. 4. Different PUs in an INTER CU may have different motion information.

The emerging HEVC working draft (WD) may be considered in view of the above discussion of H.264/AVC. In the HEVC WD, there are two modes for the prediction of motion parameters. One mode may be referred to as a "merge mode," while the other mode may be referred to as an "advanced motion vector prediction" mode or "AMVP" mode.

Merge mode is a video coding mode in which motion information (such as motion vectors, reference frame indexes, prediction directions, or other information) of a neighboring video block are inherited for a current video block being coded. An index value may be used to identify the neighbor from which the current video block inherits its motion information (e.g., top, top right, left, left bottom or co-located from a temporally adjacent frame).

Another case where the motion vector of a neighboring video block is used in the coding of a current video block is so-called motion vector prediction. In this case, predictive coding of motion vectors is applied to reduce the amount of data needed to communicate the motion vector. For example, rather than encoding and communicating the motion vector itself, the encoder encodes and communicates a motion vector difference (MVD) relative to a known (or knowable)

motion vector. Advanced motion vector prediction (AMVP) allows for many possible candidates for defining the MVD.

Both merge and AMVP modes build a candidate list for reference picture list zero or "RefPicList0" and a candidate list for reference picture list one or "RefPicList1." Each of these reference picture lists may be used for uni-directional or bi-directional prediction and specify a list of potential pictures or frames used for performing temporal and/or spatial motion prediction. A candidate of AMVP to be used for the coding of motion parameters are from spatial and temporal neighboring blocks. In the AMVP mode, the reference index values are signaled. In the merge mode, reference index values are not signaled since the current prediction unit (PU) shares the reference index values of the chosen candidate motion vector predictor. In some instances, the merge mode may be implemented such that only one candidate list is created.

After video encoder 250 generates predicted video blocks for one or more PUs of a CU, video encoder 250 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 250 may perform recursive quadtree partitioning on the residual data of the CU to partition the residual data of the CU into one or more blocks of residual data (i.e., residual video blocks) associated with transform units (TUs) of the CU. Each TU of a CU may be associated with a different residual video block. Video coder 250 may perform transform operations on each TU of the CU.

When video encoder 250 performs the transform operation on a TU, video encoder 250 may apply one or more transforms to a residual video block associated with the TU to generate one or more transform coefficient blocks (i.e., blocks of transform coefficients) associated with the TU. Conceptually, a transform coefficient block may be a two-dimensional (2D) matrix of transform coefficients.

After generating a transform coefficient block, video encoder 250 may perform a quantization operation on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 250 may associate each CU with a quantization parameter (QP) value. The QP value associated with a CU may determine how video encoder 250 quantizes transform coefficient blocks associated with the CU. Video encoder 250 may adjust the degree of quantization applied to the transform coefficient blocks associated with a CU by adjusting the QP value associated with the CU.

After video encoder 250 quantizes a transform coefficient block, video encoder 250 may scan the quantized transform coefficients to produce a one-dimensional vector of transform coefficient levels. Video encoder 250 may entropy encode the one-dimensional vector. Video encoder 250 may also entropy encode other syntax elements associated with the video data.

The bitstream generated by video encoder 250 may include a series of Network Abstraction Layer (NAL) units. Each of the NAL units may be a syntax structure containing an indication of a type of data in the NAL unit and bytes containing the data. For example, a NAL unit may contain data representing a sequence parameter set, a picture parameter set, a coded slice, supplemental enhancement information (SEI), an access unit delimiter, filler data, or another type of data. The data in a NAL unit may include entropy encoded syntax structures, such as entropy-encoded transform coefficient blocks, motion information, and so on.

Video decoder 280 may receive the bitstream generated by video encoder 250. The bitstream may include a coded representation of the video data encoded by video encoder 250. When video decoder 280 receives the bitstream, video decoder 280 may perform a parsing operation on the bitstream. When video decoder 280 performs the parsing operation, video decoder 280 may extract syntax elements from the bitstream. Video decoder 280 may reconstruct the pictures of the video data based on the syntax elements extracted from the bitstream. The process to reconstruct the video data based on the syntax elements may be generally reciprocal to the process performed by video encoder 250 to generate the syntax elements.

After video decoder 280 extracts the syntax elements associated with a CU, video decoder 280 may generate predicted video blocks for the PUs of the CU based on the syntax elements. In addition, video decoder 280 may inverse quantize transform coefficient blocks associated with TUs of the CU. Video decoder 280 may perform inverse transforms on the transform coefficient blocks to reconstruct residual video blocks associated with the TUs of the CU. After generating the predicted video blocks and reconstructing the residual video blocks, video decoder 280 may reconstruct the video block of the CU based on the predicted video blocks and the residual video blocks. In this way, video decoder 280 may determine the video blocks of CUs based on the syntax elements in the bitstream.

Figure 5:
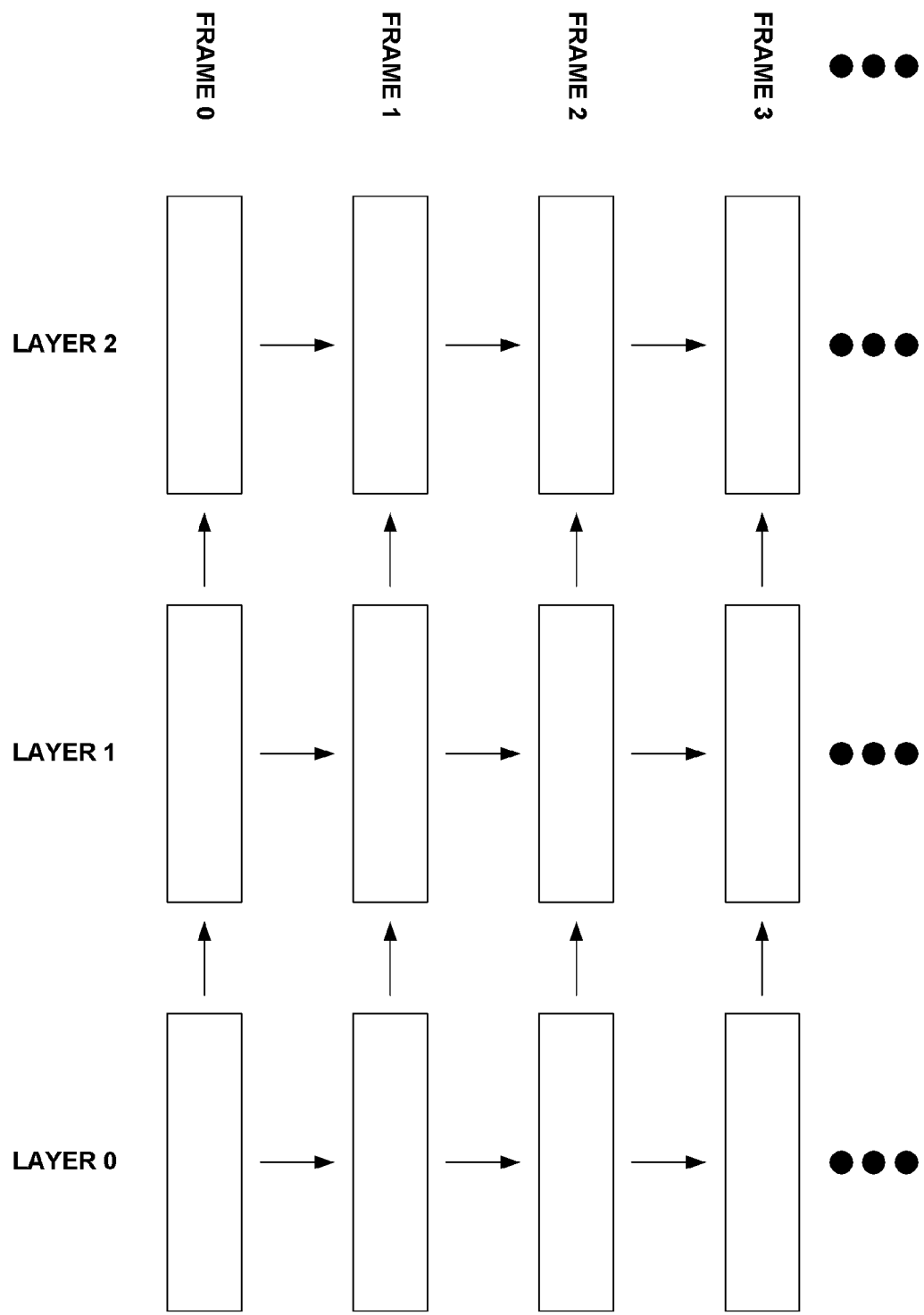
FIG. 5 is a conceptual diagram that illustrates an embodiment of scalable video coding.

In some instances, video encoder 250 and video decoder 280 may use scalable video coding (SVC). In SVC, there is one absolute base layer (layer 0) and one or more enhancement layers (layer 1, 2, 3 . . . ). Each enhancement layer may serve as a base layer for other layers above it. For example, layer 1 is an enhancement layer relative to layer 0, but layer 1 may also serve as a base layer for layer 2. Relative to its base layer, each enhancement layer may provide better quality and/or spatial or temporal resolution. Correspondingly, the scalability is called quality (or SNR) scalability, spatial scalability and temporal scalability. FIG. 5 shows an example setup for a 3-layer scalable video codec.

Figure 6:
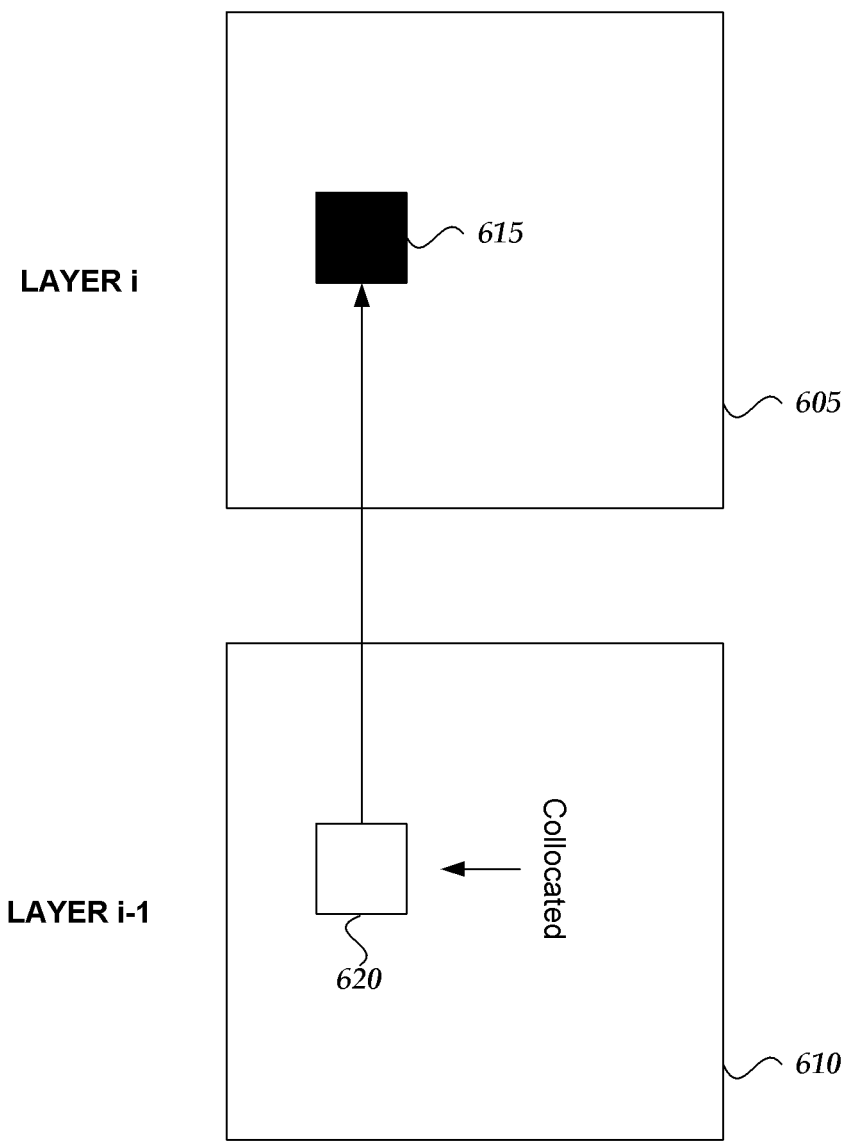
FIG. 6 is a conceptual diagram that illustrates an embodiment of INTRA_BL mode.

FIG. 6 is a conceptual diagram that illustrates an embodiment of an INTRA_BL mode. When video decoder 280 decodes a layer i 605, generally, lower layers (0, . . . , i−1) 610 have already been decoded and all information from lower layers may be available and used to code layer i. For example, for an enhancement layer block, besides regular INTRA and INTER mode described above, there can be another prediction mode: INTRA_BL mode. In INTRA_BL mode, a block 615 is predicted from a reconstructed co-located block 620 of its base layer 610, as shown in FIG. 6. For instance, if video encoder 250 encodes a block using the INTRA_BL mode, video decoder 280 may adopt the intra prediction mode of a co-located base layer block as the intra prediction mode of the block. In other words, if the block is encoded in INTRA_BL mode, video decoder 280 may predict the intra prediction mode of the block based on the intra prediction mode of the co-located base layer.

If lower layers are fully decoded before decoding the current layer, all units or blocks at lower layers are causal to current layer regardless of their locations inside the frame or slice. In low delay application where a base layer frame or slice does not have to be fully decoded before decoding a block at the current layer, it is also possible that co-located blocks at base layer of non-causal neighbors of the current block have been decoded already and thus are causal to the current block.

Prediction information (e.g. intra prediction direction and motion information) may be highly correlated spatially. For better coding efficiency of such prediction information, such prediction information may be predicted using the same prediction information from neighboring PUs and video encoder 250 only signals the prediction difference to video decoder 280. If a neighbor PU has a different mode than a current PU (e.g., one is intra mode and another is inter mode), then the prediction information of the neighbor PU may not be used to predict the prediction information of the current PU. This may hurt coding performance.

In SVC, when a neighbor PU has a certain prediction mode, how the PU's prediction information is set may affect coding performance of succeeding blocks, because the prediction information may be used in predicting the prediction information of those succeeding blocks.

In SVC, prediction information used in a lower layer block may serve as a good estimate of the prediction mode that should be used for the corresponding block in a layer currently being coded (i.e., the current layer). So, if some prediction information is not available for a block in the current layer, a video coder can propagate the same prediction information (such as intra prediction direction and motion information) from the co-located block in the base layer if available and use the prediction information as if the prediction information were the prediction information for the block in the current layer. The video coder may use the propagated prediction information in the current layer to predict the prediction information of succeeding blocks in the current layer. This may help improving coding efficiency.

Figure 7:
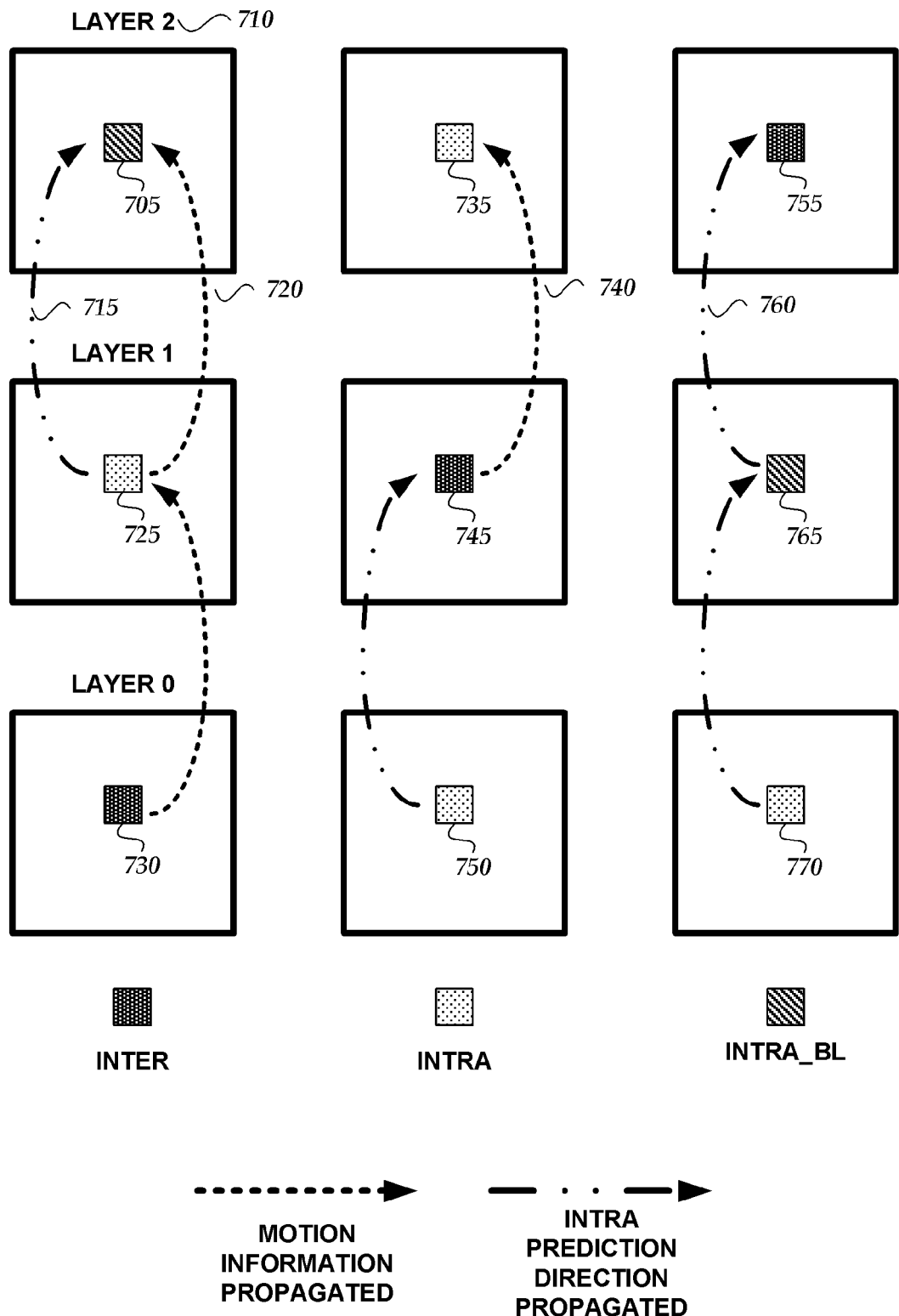
FIG. 7 is a conceptual diagram that illustrates an example embodiment of propagation of prediction information across layers.

FIG. 7 is a conceptual diagram that illustrates an example embodiment of propagation of prediction information across layers. For example, a video coder (e.g., video encoder 250 or video decoder 280) may determine that an enhancement layer neighbor block does not have a same prediction mode as a current block. In this example, the enhancement layer neighbor block and the current block may be in an enhancement layer. In addition, the video coder may determine that a base layer neighbor block has the same prediction mode as the current block. In this example, the base layer neighbor block is in a base layer and is co-located with the enhancement layer neighbor block. Under traditional implementations, when the enhancement layer neighbor block and the current block do not have the same prediction mode, a traditional system skips over using prediction information from the enhancement layer neighbor block to determine prediction information for the current block. However, in the embodiment of FIG. 7, in response to determining that the enhancement layer neighbor block does not have the same prediction mode as the current block and that the base layer neighbor block has the same prediction mode as the current block, the video coder may determine prediction information of the current block using prediction information of the base layer neighbor block. In some instances, the prediction information of the base layer neighbor block is an intra prediction mode and the prediction information of the current block is also an intra prediction mode. In other instances, the prediction information of the base layer neighbor block and the prediction information of the current block is motion information.

In the example of the previous paragraph, the video coder may predict the prediction information of the current block by including the prediction information of the base layer neighbor block as a candidate in a candidate list for the current block. In examples where the video coder encodes video data, predicting the prediction information of the current block may comprise selecting a given candidate from among candidates in the candidate list. In such examples, the video encoder may output an index of the selected candidate. In examples where the video coder decodes video data, the video decoder may receive an index of a given candidate in the candidate list. In such examples, predicting the prediction information of the current block may comprise using the prediction information of the given candidate as the prediction information of the current block.

In accordance with the techniques of this disclosure, there are at least three cases in which an enhancement layer block may borrow prediction information from a co-located block in a base layer so that such borrowed prediction information can be used in coding succeeding blocks at the current enhancement layer.

In a first case, a given block 705 is coded in INTRA_BL mode and therefore does not have native intra prediction direction or motion information. (FIG. 7, top left). In this first case, for each 4×4 sub-part of the given block 705 in the current layer 710, intra prediction direction 715 and motion information 720 is copied from the co-located sub-part 725 of its base layer. Since sub-part 725 is intra coded it does not have native motion information either. Motion information of sub-part 725 is therefore copied from the co-located sub-part 730 of its base layer, which is inter coded. The propagation of intra prediction direction and motion information in the foregoing manner may benefit prediction of succeeding blocks if the succeeding blocks are coded in intra or inter mode. The succeeding blocks may be blocks in the current layer that occur after the given block according to a coding order.

For example, the prediction mode of an enhancement layer neighbor block may be INTRA_BL and the prediction mode of a current block may be inter mode or intra mode. In this example, the prediction information of a base layer neighbor block is an intra prediction mode or motion information. In this example, a video coder may determine prediction information of the current block using prediction information of the base layer neighbor block.

In a second case, a given block 735 is coded in intra mode so it does not have native motion information (FIG. 7, top center). In this second case, for each 4×4 sub-part, motion information 740 is copied from the co-located sub-part 745 of its base layer, which is inter coded. Note in this case that although intra prediction direction is propagated from sub-part 750 to sub-part 745, it is not propagated to sub-part 735 because sub-part 735 has native intra prediction information that is more accurate. The propagation of motion information in the foregoing manner may benefit prediction of succeeding blocks if the succeeding blocks are coded in inter mode. The succeeding blocks may be blocks in the current layer that occur after the given block according to a coding order. For example, the prediction mode of an enhancement layer neighbor block may be intra mode and the prediction mode of a current block may be inter mode. In this example, a video coder may determine prediction information of the current block using prediction information of the base layer neighbor block.

In a third case, a current block 755 is coded in inter mode. (FIG. 7, top right). In this third case, for each 4×4 sub-part, intra prediction direction 760 may be copied from the co-located sub-part 765 of its base layer, if available. Since sub-part 765 is coded as INTRA_BL, it does not have native intra prediction information, so intra prediction information is copied from co-located sub-part 770 of its base layer. The propagation of intra prediction information in the foregoing manner may benefit prediction of succeeding blocks if the succeeding blocks are coded in intra mode. The succeeding blocks may be blocks in the current layer that occur after the given block according to a coding order. For example, the prediction mode of the enhancement layer neighbor block may be inter mode and the prediction mode of the current block may be intra mode. In this example, a video coder may determine prediction information of the current block using prediction information of the base layer neighbor block.

Furthermore, in accordance with the techniques of this disclosure, the following may be performed while propagating prediction information across layers:

First, in case the base layer and the enhancement layer do not have the same spatial resolution (e.g., spatial scalability scenario), a video coder may need to process prediction information accordingly. For example, a video coder may need to scale motion vectors may in this case based on spatial scaling ratio between the two layers.

In this way, an enhancement layer and a base layer may have different spatial resolutions and the prediction information of a base layer neighbor block may comprise a motion vector. A video coder may determine the prediction information of a current block at least in part by scaling the motion vector.

Second, information from a co-located block in the base layer may be propagated directly to the current layer if the reference picture of the co-located block in base layer is also in the current layer reference picture list. Otherwise, proper mapping may be needed. For example, a video coder may scale motion vectors accordingly based on the picture order count (POC) distance of the reference picture in base layer block relative to the current picture and the POC distance of the reference picture in the current enhancement layer relative to the current picture.

For example, the prediction information of a base layer neighbor block may comprise a motion vector and a reference picture index that indicates a reference picture in a base layer reference picture list. In this example, the base layer reference picture list may be a reference picture list associated with the base layer neighbor block. Furthermore, in this example, an enhancement layer reference picture list is different than the base layer reference picture list. The enhancement layer reference picture list is a reference picture list associated with the enhancement layer neighbor block. In this example, a video coder may determine the prediction information of the current block at least in part by scaling the motion vector based on a picture order count (POC) distance of the reference picture relative to a current picture and a POC distance of a reference picture in the enhancement layer reference picture list relative to the current picture.

Prediction information propagated from base layer may be assigned a lower weight than prediction information obtained from the current layer in forming a predictor for coding the prediction information of a given block. For example, determining the prediction information of a current block may comprise assigning a lower weight to the prediction information of a base layer neighbor block relative to prediction information of a block in an enhancement layer.

Figure 8:
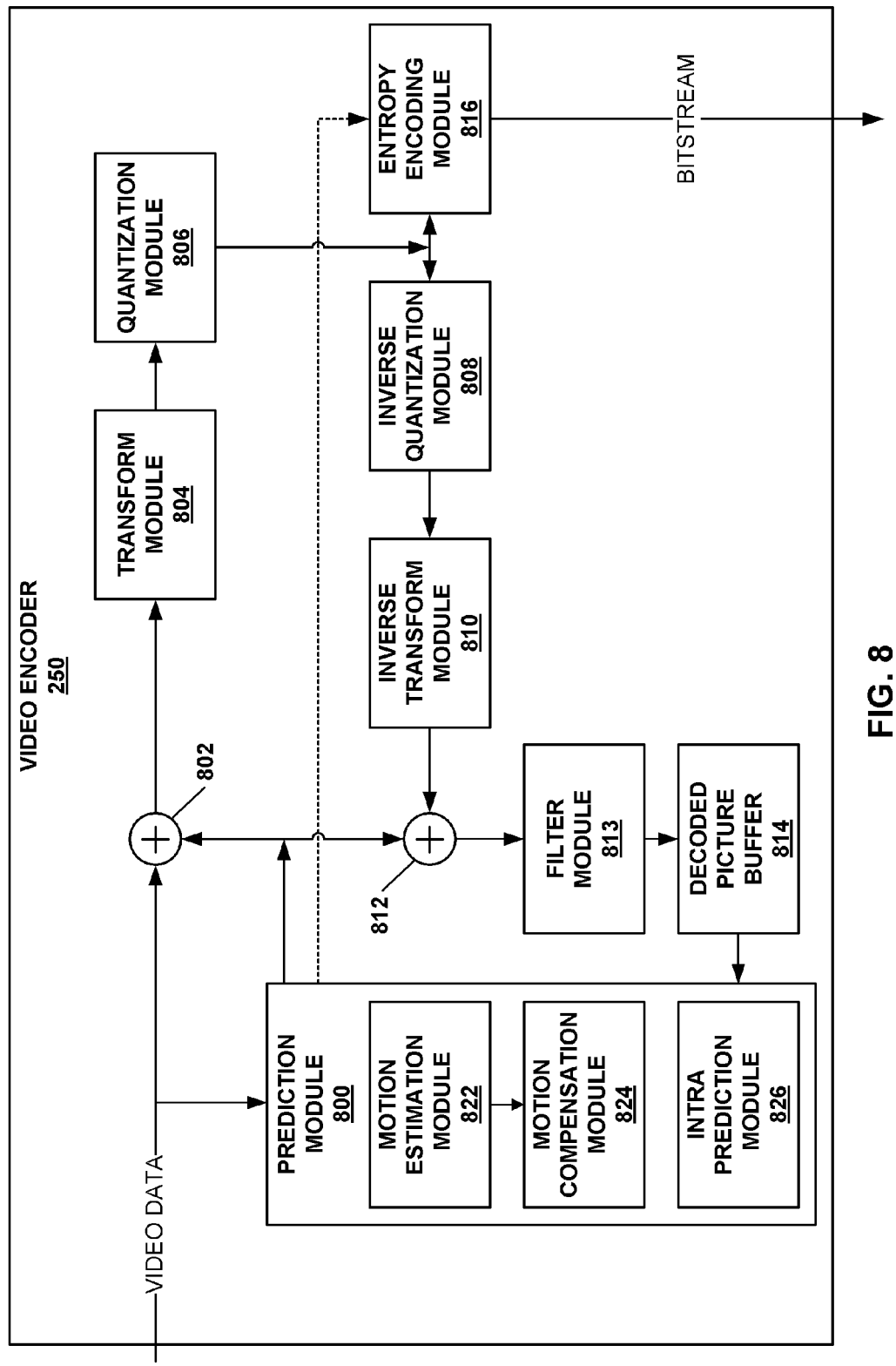
FIG. 8 is a block diagram illustrating an example embodiment of a video encoder that may implement the techniques of this disclosure.

FIG. 8 is a block diagram that illustrates an example embodiment of a video encoder 250 that is configured to implement the techniques of this disclosure. FIG. 8 is provided for purposes of explanation and should not be considered limiting of the techniques as broadly exemplified and described in this disclosure. For purposes of explanation, this disclosure describes video encoder 250 in the context of HEVC coding. However, the techniques of this disclosure may be applicable to other coding standards or methods.

In the example of FIG. 8, video encoder 250 includes a plurality of functional components. The functional components of video encoder 250 include a prediction module 800, a residual generation module 802, a transform module 804, a quantization module 806, an inverse quantization module 808, an inverse transform module 810, a reconstruction module 812, a filter module 813, a decoded picture buffer 814, and an entropy encoding module 816. Prediction module 800 includes a motion estimation module 822, a motion compensation module 824, and an intra prediction module 826. In other examples, video encoder 250 may include more, fewer, or different functional components. Furthermore, motion estimation module 822 and motion compensation module 824 may be highly integrated, but are represented in the example of FIG. 8 separately for purposes of explanation.

Video encoder 250 may receive video data. Video encoder 250 may receive the video data from various sources. For example, video encoder 250 may receive the video data from video source 240 (FIG. 2) or another source. The video data may represent a series of pictures. To encode the video data, video encoder 250 may perform an encoding operation on each of the pictures. As part of performing the encoding operation on a picture, video encoder 250 may perform encoding operations on each slice of the picture. As part of performing an encoding operation on a slice, video encoder 250 may perform encoding operations on treeblocks in the slice.

As part of performing an encoding operation on a treeblock, prediction module 800 may perform quadtree partitioning on the video block of the treeblock to divide the video block into progressively smaller video blocks. Each of the smaller video blocks may be associated with a different CU. For example, prediction module 800 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction module 800 may generate a hierarchical quadtree data structure for the treeblock. For example, a treeblock may correspond to a root node of the quadtree data structure. If prediction module 800 partitions the video block of the treeblock into four sub-blocks, the root node has four child nodes in the quadtree data structure. Each of the child nodes corresponds to a CU associated with one of the sub-blocks. If prediction module 800 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 250 may perform encoding operations on each non-partitioned CU of a treeblock. When video encoder 250 performs an encoding operation on a non-partitioned CU, video encoder 250 generates data representing an encoded representation of the non-partitioned CU.

As part of performing an encoding operation on a CU, prediction module 800 may partition the video block of the CU among one or more PUs of the CU. Video encoder 250 and video decoder 280 may support various PU sizes. Assuming that the size of a particular CU is 2N×2N, video encoder 250 and video decoder 280 may support PU sizes of 2N×2N or N×N, and inter-prediction in symmetric PU sizes of 2N×2N, 2N×N, N×2N, N×N, 2N×nU, nL×2N, nR×2N, or similar. Video encoder 250 and video decoder 280 may also support asymmetric partitioning for PU sizes of 2N×nU, 2N×nD, nL×2N, and nR×2N. In some examples, prediction module 800 may perform geometric partitioning to partition the video block of a CU among PUs of the CU along a boundary that does not meet the sides of the video block of the CU at right angles.

Motion estimation module 822 and motion compensation module 824 may perform inter prediction on each PU of the CU. Inter prediction may provide temporal compression. To perform inter prediction on a PU, motion estimation module 822 may generate motion information for the PU. Motion compensation module 824 may generate a predicted video block for the PU based the motion information and decoded samples of pictures other than the picture associated with the CU (e.g., reference pictures). In this disclosure, a predicted video block generated by motion compensation module 824 may be referred to as an inter-predicted video block.

Slices may be I slices, P slices, or B slices. Motion estimation module 822 and motion compensation module 824 may perform different operations for a PU of a CU depending on whether the PU is in an I slice, a P slice, or a B slice. In an I slice, all PUs are intra predicted. Hence, if the PU is in an I slice, motion estimation module 822 and motion compensation module 824 do not perform inter prediction on the PU.

If the PU is in a P slice, the picture containing the PU is associated with a list of reference pictures referred to as "list 0." Each of the reference pictures in list 0 contains samples that may be used for inter prediction of subsequent pictures in decoding order. When motion estimation module 822 performs the motion estimation operation with regard to a PU in a P slice, motion estimation module 822 may search the reference pictures in list 0 for a reference sample for the PU. The reference sample of the PU may be a set of samples, e.g., a block of samples, that most closely corresponds to the samples in the video block of the PU. Motion estimation module 822 may use a variety of metrics to determine how closely a set of samples in a reference picture corresponds to the samples in the video block of a PU. For example, motion estimation module 822 may determine how closely a set of samples in a reference picture corresponds to the samples in the video block of a PU by sum of absolute difference (SAD), sum of square difference (SSD), or other difference metrics.

After identifying a reference sample of a PU in a P slice, motion estimation module 822 may generate a reference index that indicates the reference picture in list 0 containing the reference sample and a motion vector that indicates a spatial displacement between the PU and the reference sample. In various examples, motion estimation module 822 may generate motion vectors to varying degrees of precision. For example, motion estimation module 822 may generate motion vectors at one-quarter sample precision, one-eighth sample precision, or other fractional sample precision. In the case of fractional sample precision, reference sample values may be interpolated from integer-position sample values in the reference picture. Motion estimation module 822 may output the reference index and the motion vector as the motion information of the PU. Motion compensation module 824 may generate a predicted video block of the PU based on the reference sample identified by the motion information of the PU.

If the PU is in a B slice, the picture containing the PU may be associated with two lists of reference pictures, referred to as "list 0" and "list 1." Each of the reference pictures in list 0 contains samples that may be used for inter prediction of subsequent pictures in decoding order. The reference pictures in list 1 occur before the picture in decoding order but after the picture in presentation order. In some examples, a picture containing a B slice may be associated with a list combination that is a combination of list 0 and list 1.

Furthermore, if the PU is in a B slice, motion estimation module 822 may perform uni-directional prediction or bi-directional prediction for the PU. When motion estimation module 822 performs uni-directional prediction for the PU, motion estimation module 822 may search the reference pictures of list 0 or list 1 for a reference sample for the PU. Motion estimation module 822 may then generate a reference index that indicates the reference picture in list 0 or list 1 that contains the reference sample and a motion vector that indicates a spatial displacement between the PU and the reference sample. Motion estimation module 822 may output the reference index, a prediction direction indicator, and the motion vector as the motion information of the PU. The prediction direction indicator may indicate whether the reference index indicates a reference picture in list 0 or list 1. Motion compensation module 824 may generate the predicted video block of the PU based on the reference sample indicated by the motion information of the PU.

When motion estimation module 822 performs bi-directional prediction for a PU, motion estimation module 822 may search the reference pictures in list 0 for a reference sample for the PU and may also search the reference pictures in list 1 for another reference sample for the PU. Motion estimation module 822 may then generate reference indexes that indicate the reference pictures in list 0 and list 1 containing the reference samples and motion vectors that indicate spatial displacements between the reference samples and the PU. Motion estimation module 822 may output the reference indexes and the motion vectors of the PU as the motion information of the PU. Motion compensation module 824 may generate the predicted video block of the PU based on the reference samples indicated by the motion information of the PU.

In some instances, motion estimation module 822 does not output a full set of motion information for a PU to entropy encoding module 816. Rather, motion estimation module 822 may signal the motion information of a PU with reference to the motion information of another PU. For example, motion estimation module 822 may determine that the motion information of the PU is sufficiently similar to the motion information of a neighboring PU. In this example, motion estimation module 822 may indicate, in a quadtree node for a CU associated with the PU, a value that indicates to video decoder 280 that the PU has the same motion information as the neighboring PU. In another example, motion estimation module 822 may identify, in a quadtree node associated with the CU associated with the PU, a neighboring PU and a motion vector difference (MVD). The motion vector difference indicates a difference between the motion vector of the PU and the motion vector of the indicated neighboring PU. Video decoder 280 may use the motion vector of the indicated neighboring PU and the motion vector difference to predict the motion vector of the PU.

Alternatively, if a motion vector is not available for a neighboring PU, e.g., because the neighboring PU is intra-coded, a motion vector may be obtained from a base layer PU that corresponds to the neighboring PU. The motion vector from the base layer PU may then be used to predict the motion vector of the PU. By referring to the motion information of a first PU when signaling the motion information of a second PU, motion estimation module 822 may be able to signal the motion information of the second PU using fewer bits, whether the first PU is a neighboring PU or a base layer PU.

As part of performing an encoding operation on a CU, intra prediction module 826 may perform intra prediction on PUs of the CU. Intra prediction may provide spatial compression. When intra prediction module 826 performs intra prediction on a PU, intra prediction module 826 may generate prediction data for the PU based on decoded samples of other PUs in the same picture. The prediction data for the PU may include a predicted video block and various syntax elements. Intra prediction module 826 may perform intra prediction on PUs in I slices, P slices, and B slices.

To perform intra prediction on a PU, intra prediction module 826 may use multiple intra prediction modes to generate multiple sets of prediction data for the PU. When intra prediction module 826 uses an intra prediction mode to generate a set of prediction data for the PU, intra prediction module 826 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction module 826 may use various numbers of intra prediction modes, e.g., 33 directional intra prediction modes, depending on the size of the PU.

Prediction module 800 may select the prediction data for a PU from among the prediction data generated by motion compensation module 824 for the PU or the prediction data generated by intra prediction module 826 for the PU. In some examples, prediction module 800 selects the prediction data for the PU based on rate/distortion metrics of the sets of prediction data.

If prediction module 800 selects prediction data generated by intra prediction module 826, prediction module 800 may signal the intra prediction mode that was used to generate the prediction data for the PUs, e.g., the selected intra prediction mode. Prediction module 800 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction module 800 may generate a syntax element to indicate that the selected intra prediction mode is the same as the intra prediction mode of the neighboring PU.

If an intra prediction mode is not available for a neighboring PU, e.g., because the neighboring PU is inter coded, an intra prediction mode may be obtained from a base layer PU that corresponds to the neighboring PU. The mode information from the base layer PU may then be used to predict the mode information of the current PU. By referring to the mode information of a first PU when signaling the mode information of a second PU, prediction module 800 may be able to signal the motion information of the second PU using fewer bits, whether the first PU is a neighboring PU or a base layer PU.

After prediction module 800 selects the prediction data for PUs of a CU, residual generation module 802 may generate residual data for the CU by subtracting the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction module 800 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. Non-partitioned TUs of a CU may correspond to leaf nodes of the RQT.

A TU may have one or more sub-TUs if the residual video block associated with the TU is partitioned into multiple smaller residual video blocks. Each of the smaller residual video blocks may be associated with a different one of the sub-TUs.

Transform module 804 may generate one or more transform coefficient blocks for each non-partitioned TU of a CU by applying one or more transforms to a residual video block associated with the TU. Each of the transform coefficient blocks may be a 2D matrix of transform coefficients. Transform module 804 may apply various transforms to the residual video block associated with a TU. For example, transform module 804 may apply a discrete cosine transform (DCT), a directional transform, or a conceptually similar transform to the residual video block associated with a TU.

After transform module 804 generates a transform coefficient block associated with a TU, quantization module 806 may quantize the transform coefficients in the transform coefficient block. Quantization module 806 may quantize a transform coefficient block associated with a TU of a CU based on a QP value associated with the CU.

Video encoder 250 may associate a QP value with a CU in various ways. For example, video encoder 250 may perform a rate-distortion analysis on a treeblock associated with the CU. In the rate-distortion analysis, video encoder 250 may generate multiple coded representations of the treeblock by performing an encoding operation multiple times on the treeblock. Video encoder 250 may associate different QP values with the CU when video encoder 250 generates different encoded representations of the treeblock. Video encoder 250 may signal that a given QP value is associated with the CU when the given QP value is associated with the CU in a coded representation of the treeblock that has a lowest bitrate and distortion metric.

Inverse quantization module 808 and inverse transform module 810 may apply inverse quantization and inverse transforms to the transform coefficient block, respectively, to reconstruct a residual video block from the transform coefficient block. Reconstruction module 812 may add the reconstructed residual video block to corresponding samples from one or more predicted video blocks generated by prediction module 800 to produce a reconstructed video block associated with a TU. By reconstructing video blocks for each TU of a CU in this way, video encoder 250 may reconstruct the video block of the CU.

After reconstruction module 812 reconstructs the video block of a CU, filter module 813 may perform a deblocking operation to reduce blocking artifacts in the video block associated with the CU. After performing the one or more deblocking operations, filter module 813 may store the reconstructed video block of the CU in decoded picture buffer 814. Motion estimation module 822 and motion compensation module 824 may use a reference picture that contains the reconstructed video block to perform inter prediction on PUs of subsequent pictures. In addition, intra prediction module 826 may use reconstructed video blocks in decoded picture buffer 814 to perform intra prediction on other PUs in the same picture as the CU.

In this way, after filter module 813 applies a deblocking filter to the samples associated with an edge, prediction module 800 may generate a predicted video block based at least in part on the samples associated with the edge. Video encoder 250 may output a bitstream that includes one or more syntax elements whose values are based at least in part on the predicted video block.

Entropy encoding module 816 may receive data from other functional components of video encoder 250. For example, entropy encoding module 816 may receive transform coefficient blocks from quantization module 806 and may receive syntax elements from prediction module 800. When entropy encoding module 816 receives the data, entropy encoding module 816 may perform one or more entropy encoding operations to generate entropy encoded data. For example, video encoder 250 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding module 816 may output a bitstream that includes the entropy encoded data.

As part of performing an entropy encoding operation on data, entropy encoding module 816 may select a context model. If entropy encoding module 816 is performing a CABAC operation, the context model may indicate estimates of probabilities of particular bins having particular values. In the context of CABAC, the term "bin" is used to refer to a bit of a binarized version of a syntax element.

If the entropy encoding module 816 is performing a CAVLC operation, the context model may map coefficients to corresponding codewords. Codewords in CAVLC may be constructed such that relatively short codes correspond to more probable symbols, while relatively long codes correspond to less probable symbols. Selection of an appropriate context model may impact coding efficiency of the entropy encoding operation.

Figure 9:
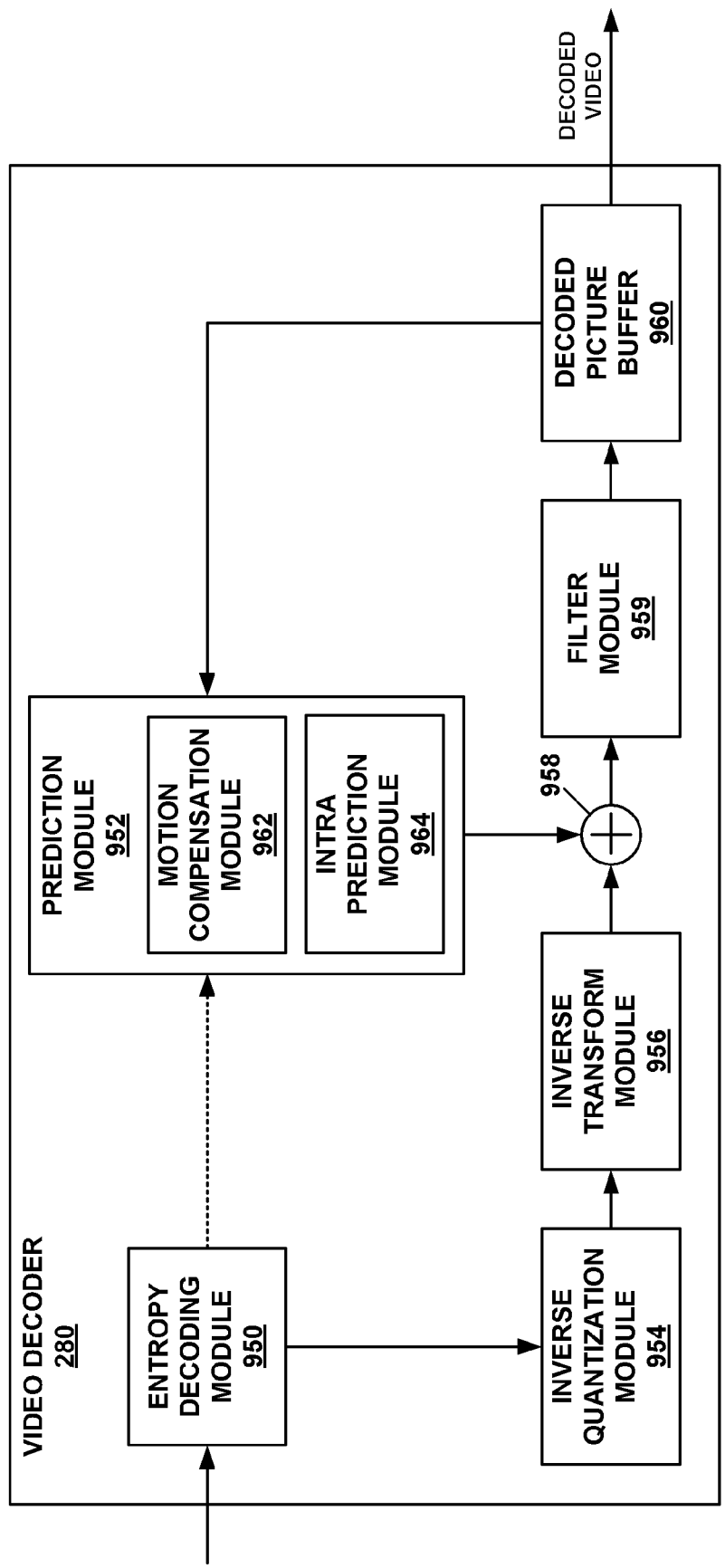
FIG. 9 is a block diagram illustrating an example embodiment of a video decoder that may implement the techniques of this disclosure.

FIG. 9 is a block diagram that illustrates an example embodiment of a video decoder 280 that may implement the techniques of this disclosure. FIG. 9 is provided for purposes of explanation and is not limiting on the techniques as broadly exemplified and described in this disclosure. For purposes of explanation, this disclosure describes video decoder 280 in the context of HEVC coding. However, the techniques of this disclosure may be applicable to other coding standards or methods.

In the example of FIG. 9, video decoder 280 includes a plurality of functional components. The functional components of video decoder 280 include an entropy decoding module 950, a prediction module 952, an inverse quantization module 954, an inverse transform module 956, a reconstruction module 958, a filter module 959, and a decoded picture buffer 960. Prediction module 952 includes a motion compensation module 962 and an intra prediction module 964. In some examples, video decoder 280 may perform a decoding pass generally reciprocal to the encoding pass described with respect to video encoder 250 of FIG. 8. In other examples, video decoder 280 may include more, fewer, or different functional components.

Video decoder 280 may receive a bitstream that comprises encoded video data. The bitstream may include a plurality of syntax elements. When video decoder 280 receives the bitstream, entropy decoding module 950 may perform a parsing operation on the bitstream. As a result of performing the parsing operation on the bitstream, entropy decoding module 950 may extract syntax elements from the bitstream. As part of performing the parsing operation, entropy decoding module 950 may entropy decode entropy encoded syntax elements in the bitstream. Prediction module 952, inverse quantization module 954, inverse transform module 956, reconstruction module 958, and filter module 959 may perform a reconstruction operation that generates decoded video data based on the syntax elements extracted from the bitstream.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding module 950 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding module 950 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding module 950 may perform an entropy decoding operation, such as a CAVLC decoding operation, on the coded slice header to recover the slice header.

After extracting the slice data from coded slice NAL units, entropy decoding module 950 may extract coded treeblocks from the slice data. Entropy decoding module 950 may then extract coded CUs from the coded treeblocks. Entropy decoding module 950 may perform parsing operations that extract syntax elements from the coded CUs. The extracted syntax elements may include entropy-encoded transform coefficient blocks. Entropy decoding module 950 may then perform entropy decoding operations on the syntax elements. For instance, entropy decoding module 950 may perform CABAC operations on the transform coefficient blocks.

After entropy decoding module 950 performs a parsing operation on a non-partitioned CU, video decoder 280 may perform a reconstruction operation on the non-partitioned CU. To perform the reconstruction operation on a non-partitioned CU, video decoder 280 may perform a reconstruction operation on each TU of the CU. By performing the reconstruction operation for each TU of the CU, video decoder 280 may reconstruct a residual video block associated with the CU.

As part of performing a reconstruction operation on a TU, inverse quantization module 954 may inverse quantize, i.e., de-quantize, a transform coefficient block associated with the TU. Inverse quantization module 954 may inverse quantize the transform coefficient block in a manner similar to the inverse quantization processes proposed for HEVC or defined by the H.264 decoding standard. Inverse quantization module 954 may use a quantization parameter QP calculated by video encoder 250 for a CU of the transform coefficient block to determine a degree of quantization and, likewise, a degree of inverse quantization for inverse quantization module 954 to apply.

After inverse quantization module 954 inverse quantizes a transform coefficient block, inverse transform module 956 may generate a residual video block for the TU associated with the transform coefficient block. Inverse transform module 956 may apply an inverse transform to the transform coefficient block in order to generate the residual video block for the TU. For example, inverse transform module 956 may apply an inverse DCT, an inverse integer transform, an inverse Karhunen-Loeve transform (KLT), an inverse rotational transform, an inverse directional transform, or another inverse transform to the transform coefficient block.

In some examples, inverse transform module 956 may determine an inverse transform to apply to the transform coefficient block based on signaling from video encoder 250. In such examples, inverse transform module 956 may determine the inverse transform based on a signaled transform at the root node of a quadtree for a treeblock associated with the transform coefficient block. In other examples, inverse transform module 956 may infer the inverse transform from one or more coding characteristics, such as block size, coding mode, or the like. In some examples, inverse transform module 956 may apply a cascaded inverse transform.

If a PU of the CU was encoded using inter prediction, motion compensation module 962 may perform motion compensation to generate a predicted video block for the PU. Motion compensation module 962 may use motion information for the PU to identify a reference sample for the PU. The reference sample of a PU may be in a different temporal picture than the PU. The motion information for the PU may include a motion vector, a reference picture index, and a prediction direction. Motion compensation module 962 may use the reference sample for the PU to generate the predicted video block for the PU. In some examples, motion compensation module 962 may predict the motion information for the PU based on motion information of PUs that neighbor the PU. Alternatively, if the neighboring PUs are not inter-coded, motion compensation module 962 may determine the motion information based on the motion information of a base layer PU that corresponds to a neighboring PU. In this disclosure, a PU is an inter-predicted PU if video encoder 250 uses inter prediction to generate the predicted video block of the PU.

In some examples, motion compensation module 962 may refine the predicted video block of a PU by performing interpolation based on interpolation filters. Identifiers for interpolation filters to be used for motion compensation with sub-sample precision may be included in the syntax elements. Motion compensation module 962 may use the same interpolation filters used by video encoder 250 during generation of the predicted video block of the PU to calculate interpolated values for sub-integer samples of a reference block. Motion compensation module 962 may determine the interpolation filters used by video encoder 250 according to received syntax information and use the interpolation filters to produce the predicted video block.

If a PU is encoded using intra prediction, intra prediction module 964 may perform intra prediction to generate a predicted video block for the PU. For example, intra prediction module 964 may determine an intra prediction mode for the PU based on syntax elements in the bitstream. The bitstream may include syntax elements that intra prediction module 964 may use to predict the intra prediction mode of the PU.

In some instances, the syntax elements may indicate that intra prediction module 964 is to use the intra prediction mode of another PU to predict the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction module 964 may then use the intra prediction mode to generate prediction data (e.g., predicted samples) for the PU based on the video blocks of spatially neighboring PUs. Alternatively, if the neighboring PUs are not intra-coded, intra prediction module 964 may determine the intra prediction mode by reference to a base layer PU that corresponds to a neighboring PU, rather than by reference to the neighboring PU itself.

Reconstruction module 958 may use the residual video blocks associated with TUs of a CU and the predicted video blocks of the PUs of the CU, e.g., either intra-prediction data or inter-prediction data, as applicable, to reconstruct the video block of the CU. Thus, video decoder 280 may generate a predicted video block and a residual video block based on syntax elements in the bitstream and may generate a video block based on the predicted video block and the residual video block.

After reconstruction module 958 reconstructs the video block of the CU, filter module 959 may perform a deblocking operation to reduce blocking artifacts associated with the CU. After filter module 959 performs a deblocking operation to reduce blocking artifacts associated with the CU, video decoder 280 may store the video block of the CU in decoded picture buffer 960. Decoded picture buffer 960 may provide reference pictures for subsequent motion compensation, intra prediction, and presentation on a display device, such as display device 290 of FIG. 2. For instance, video decoder 280 may perform, based on the video blocks in decoded picture buffer 960, intra prediction or inter prediction operations on PUs of other CUs.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
    identifying an enhancement layer (EL) video unit that neighbors a current video unit in an EL, wherein the EL video unit is associated with neither an intra prediction direction nor motion information;
    determining first prediction information of a first video unit located in a first lower layer, wherein the first video unit is co-located with respect to the EL video unit, the first prediction information including an intra prediction direction used for intra prediction;
    determining second prediction information of a second video unit located in a second lower layer that is different from the first lower layer, wherein the second video unit is co-located with respect to the EL video unit, the second prediction information including motion information used for inter prediction; and
    decoding the current video unit in one of (i) intra mode based on the intra prediction direction included in the first prediction information or (ii) inter mode based on the motion information included in the second prediction information.

2. The method of claim 1, wherein the first video unit is coded in intra mode based on a spatially neighboring video unit in the first lower layer.

3. The method of claim 2, wherein the current video unit and the first video unit are both coded in intra mode.

4. The method of claim 1, wherein the second video unit is coded in inter mode based on a temporally neighboring video unit in the second lower layer.

5. The method of claim 4, wherein the current video unit and the second video unit are both coded in inter mode.

6. The method of claim 1,
    wherein the EL video unit is coded in INTRA BL mode.

7. The method of claim 1, wherein the second prediction information of the second video unit is included as a candidate in a candidate list of the current video unit, and wherein decoding the current video unit comprises receiving an index of the candidate included in the candidate list.

8. The method of claim 1,
    wherein the EL and the second lower layer have different spatial resolutions;
    wherein the second prediction information of the second video unit comprises a motion vector; and
    wherein decoding the current video unit comprises scaling the motion vector based on the spatial resolutions.

9. The method of claim 1,
    wherein a first picture order count (POC) distance comprises a difference in POC between a current picture associated with the current video unit and a first reference picture in the EL;
    wherein a second POC distance comprises a difference in POC between a lower layer picture associated with the second video unit and a second reference picture in the second lower layer; and
    wherein decoding the current video unit comprises scaling a motion vector of the second video unit based at least in part on the first POC distance and the second POC distance.

10. The method of claim 1, wherein decoding the current video unit comprises assigning a lower weight to the at least one of the first prediction information or the second prediction information relative to third prediction information of a third video unit in the EL.

11. A method for encoding video data, the method comprising:
    identifying an enhancement layer (EL) video unit that neighbors a current video unit in an EL, wherein the EL video unit is associated with neither an intra prediction direction nor motion information;

determining first prediction information of a first video unit located in a first lower layer, wherein the first video unit is co-located with respect to the EL video unit, the first prediction information including an intra prediction direction used for intra prediction;

determining second prediction information of a second video unit located in a second lower layer that is different from the first lower layer, wherein the second video unit is co-located with respect to the EL video unit, the second prediction information including motion information used for inter prediction; and encoding the current video unit in one of (i) intra mode based on the intra prediction direction included in the first prediction information or (ii) inter mode based on the motion information included in the second prediction information.

12. The method of claim 11, wherein the first video unit is coded in intra mode based on a spatially neighboring video unit in the first lower layer.

13. The method of claim 12, wherein the current video unit and the first video unit are both coded in intra mode.

14. The method of claim 11, wherein the second video unit is coded in inter mode based on a temporally neighboring video unit in the second lower layer.

15. The method of claim 14, wherein the current video unit and the second video unit are both coded in inter mode.

16. The method of claim 11,
wherein the EL video unit is coded in INTRA BL mode.

17. The method of claim 11, further comprising outputting an index, wherein the index indicates a second lower layer candidate in a candidate list associated with the current video unit, and wherein the second lower layer candidate comprises the second prediction information of the second video unit.

18. The method of claim 11,
wherein the EL and the second lower layer have different spatial resolutions;
wherein the second prediction information of the second video unit comprises a motion vector; and
wherein encoding the current video unit comprises scaling the motion vector based on the spatial resolutions.

19. The method of claim 11,
wherein a first picture order count (POC) distance comprises a difference in POC between a current picture associated with the current video unit and a first reference picture in the EL;
wherein a second POC distance comprises a difference in POC between a lower layer picture associated with the second video unit and a second reference picture in the second lower layer; and
wherein encoding the current video unit comprises scaling a motion vector of the second video unit based at least in part on the first POC distance and the second POC distance.

20. The method of claim 11, wherein encoding the current video unit comprises assigning a lower weight to the at least one of the first prediction information or the second prediction information relative to third prediction information of a third video unit in the EL.

21. An apparatus for coding video data, the apparatus comprising:
a memory configured to store prediction information associated with an enhancement layer (EL), the EL including a current video unit and an EL video unit that neighbors the current video unit, wherein the EL video unit is associated with neither an intra prediction direction nor motion information;
a processor in communication with the memory, the processor configured to:
determine first prediction information of a first video unit located in a first lower layer, wherein the first video unit is co-located with respect to the EL video unit, the first prediction information including an intra prediction direction used for intra prediction;
determine second prediction information of a second video unit located in a second lower layer that is different from the first lower layer, wherein the second video unit is co-located with respect to the EL video unit, the second prediction information including motion information used for inter prediction; and
code the current video unit in one of (i) intra mode based on the intra prediction direction included in the first prediction information or (ii) inter mode based on the motion information included in the second prediction information.

22. The apparatus of claim 21, wherein the first video unit is coded in intra mode based on a spatially neighboring video unit in the first lower layer.

23. The apparatus of claim 22, wherein the current video unit and the first video unit are both coded in intra mode.

24. The apparatus of claim 21, wherein the second video unit is coded in inter mode based on a temporally neighboring video unit in the second lower layer.

25. The apparatus of claim 24, wherein the current video unit and the second video unit are both coded in inter mode.

26. The apparatus of claim 21,
wherein the EL video unit is coded in INTRA BL mode.

27. The apparatus of claim 21, wherein the processor is configured to include a candidate comprising the second prediction information of the second video unit in a candidate list for the current video unit.

28. The apparatus of claim 27, wherein the processor is further configured to code the current video unit based on the candidate in the candidate list.

29. The apparatus of claim 27, wherein the processor is further configured to process an index associated with the candidate in the candidate list.

30. The apparatus of claim 21,
wherein the EL and the second lower layer have different spatial resolutions,
wherein the second prediction information of the second video unit comprises a motion vector, and
wherein the processor is configured to code the current video unit by scaling the motion vector based on the spatial resolutions.

31. The apparatus of claim 21,
wherein a first picture order count (POC) distance comprises a difference in POC between a current picture associated with the current video unit and a first reference picture in the EL;
wherein a second POC distance comprises a difference in POC between a lower layer picture associated with the second video unit and a second reference picture in the second lower layer; and
wherein coding the current video unit comprises scaling a motion vector of the second video unit based at least in part on the first POC distance and the second POC distance.

32. A video coding device comprising:
means for identifying an enhancement layer (EL) video unit that neighbors a current video unit in an EL, wherein the EL video unit is associated with neither an intra prediction direction nor motion information;

means for determining first prediction information of a first video unit located in a first lower layer, wherein the first video unit is co-located with respect to the EL video unit, the first prediction information including an intra prediction direction used for intra prediction;

means for determining second prediction information of a second video unit located in a second lower layer that is different from the first lower layer, wherein the second video unit is co-located with respect to the EL video unit, the second prediction information including motion information used for inter prediction; and means for coding the current video unit in one of (i) intra mode based on the intra prediction direction included in the first prediction information or (ii) inter mode based on the motion information included in the second prediction information.

33. The video coding device of claim 32,
wherein the EL and the second lower layer have different spatial resolutions;
wherein the second prediction information of the second video unit comprises a motion vector; and
wherein coding the current video unit comprises scaling the motion vector based on the spatial resolutions.

34. The video coding device of claim 32,
wherein a first picture order count (POC) distance comprises a difference in POC between a current picture associated with the current video unit and a first reference picture in the EL;
wherein a second POC distance comprises a difference in POC between a lower layer picture associated with the second video unit and a second reference picture in the second lower layer; and
wherein coding the current video unit comprises scaling a motion vector of the second video unit based at least in part on the first POC distance and the second POC distance.

35. The video coding device of claim 32, wherein the means for coding the current video unit comprises means for assigning a lower weight to the at least one of the first prediction information or the second prediction information relative to third prediction information of a third video unit in the EL.

36. Non-transitory computer storage having stored thereon instructions that, when executed by a computer system having computer storage, cause the computer system to:
identify an enhancement layer (EL) video unit that neighbors a current video unit in an EL, wherein the EL video unit is associated with neither an intra prediction direction nor motion information;

determine first prediction information of a first video unit located in a first lower layer, wherein the first video unit is co-located with respect to the EL video unit, the first prediction information including an intra prediction direction used for intra prediction;

determine second prediction information of a second video unit located in a second lower layer that is different from the first lower layer, wherein the second video unit is co-located with respect to the EL video unit, the second prediction information including motion information used for inter prediction; and code the current video unit in one of (i) intra mode based on the intra prediction direction included in the first prediction information or (ii) inter mode based on the motion information included in the second prediction information.

37. The non-transitory computer storage of claim 36,
wherein the EL and the second lower layer have different spatial resolutions;
wherein the second prediction information of the second video unit comprises a motion vector; and
wherein coding the current video unit comprises scaling the motion vector based on the spatial resolutions.

38. The non-transitory computer storage of claim 36,
wherein a first picture order count (POC) distance comprises a difference in POC between a current picture associated with the current video unit and a first reference picture in the EL;
wherein a second POC distance comprises a difference in POC between a lower layer picture associated with the second video unit and a second reference picture in the second lower layer; and
wherein coding the current video unit comprises scaling a motion vector of the second video unit based at least in part on the first POC distance and the second POC distance.

39. The non-transitory computer storage of claim 36, wherein the instructions further cause, when executed, the computer system to assign a lower weight to the at least one of the first prediction information or the second prediction information relative to third prediction information of a third video unit in the EL.

* * * * *